United States Patent Office 3,840,523
Patented Oct. 8, 1974

3,840,523
TRICYCLIC ARYLALKYLENE LACTAMIMIDES
J. Martin Grisar, George P. Claxton, and Robert D. MacKenzie, Cincinnati, Ohio, assignors to Richardson-Merrell Inc., New York, N.Y.
No Drawing. Filed Apr. 25, 1973, Ser. No. 354,441
Int. Cl. C07d 27/04, 29/28, 41/04
U.S. Cl. 260—239 B          5 Claims

ABSTRACT OF THE DISCLOSURE

Novel derivatives of tricyclic arylalkylene lactamimides useful as anticoagulants.

FIELD OF THE INVENTION

This invention relates to tricyclic arylalkylene lactamimide derivatives their preparation and their use as an anticoagulant on blood platelets.

DESCRIPTION OF PRIOR ART

The closest are known to applicants is copending applications U.S. Ser. No. 321,288, filed Jan. 5, 1973, and U.S. Ser. No. 143,257, filed May 13, 1971, and now abandoned the latter application having been published as Belgian Pat. No.783,275. Application Serial No. 321,288 discloses a class of tricyclic lactamimides in which the tricyclic moiety is a 5H-dibenzo[a,d]cycloheptene ring system, whereas application Ser. No. 143,257 discloses a class of tricyclic lactamimides in which the tricyclic moiety is a fluorene ring. Both applications discloses compounds having a variety of utilities including diuretic, hypoglycemic, antiinflammatory and anticoagulant activity. In both classes of compounds the lactamimide portion of the molecule is attached directly to the tricyclic aromatic ring, and more particularly to the aliphatic portion of the tricyclic nucleus.

Applicants' novel series of tricyclic arylalkylene lactamimides are chemically distinct in that a mandatory alkylene bridge separates the lactamimide portion of the molecule from the tricyclic aromatic ring system, i.e., the lactamimide portion of the molecule is not attached to the tricyclic aromatic ring. Moreover, the attachment, which takes place via an alipahtic bridge, is made on the aromatic and not the aliphatic portion of the tricyclic nucleus. Applicants have discovered that this separation of the lactamimide portion of the molecule from the aromatic tricyclic nucleus is essential for the preparation of compounds having a specific anticoagulant utility without concomitant hypoglycemic or diuretic side effects.

SUMMARY OF THE INVENTION

This invention relates to novel tricyclic arylalkylene lactamimides. More particularly, this invention relates to a class of substituted tricyclic arylalkylene lactamimides which are useful in preventing the coagulation of blood and which may be represented by the general formula:

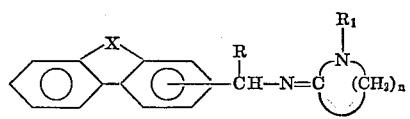

(I)

wherein $n$ is an integer of from 3 to 11; R and $R_1$ are each selected from the group consisting of hydrogen and lower alkyl having from 1 to 4 carbon atoms; X is selected from the group consisting of —$CH_2$—, —CH=CH—, —$CH_2CH_2$—, —O— and —S—; and the pharmaceutically acceptable acid addition salts thereof.

In general the compounds of this invention are prepared by reacting a primary amine with a lactim ether to form a lactamimide. Alternatively, the instant compounds can also be prepared by the formation of a lactam complex and the subsequent reaction of this complex with an appropriate primary amine.

A variety of compositions are also included within the scope of the present invention which are useful in preventing platelet aggregation.

DETAILED DESCRIPTION OF THE INVENTION

For purposes of convenience and uniformity, all of the compounds of the present invention are represented as 2-substituted imino lactamimides as shown in Formula (I) above. Such compounds and their acid addition salts may also exist in their tautomeric form as illustrated by the following formula:

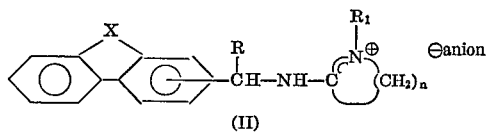

(II)

This tautomerism has been discussed by R. Kwok and P. Pranc, J. Org. Chem. 32, 740 (1967). When represented in this fashion, the compounds of the present invention would also be named differently, as for example, 2-[1-(2-dibenzothienyl)ethylimino]-hexahydro-1H-azepine would be named as 7-[1-(2-dibenzothienyl)ethylamino]-3,4,5,6-tetrahydro-2H-azepine.

In solution under conditions of therapeutic utility, the proportion of each tautomeric form, as expressed by the delocalization of the positive charge between the two nitrogen atoms, will be dependent upon various factors including the nature of the side chain substituents, the pH of the medium, and temperature. This equilibrium state can be conveniently represented by the following formula:

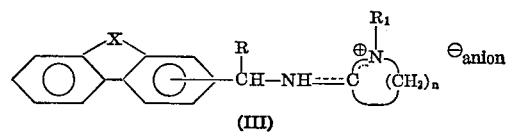

(III)

Thus, under a given set of conditions the instant compounds are present in either of their tautomeric forms as illustrated by Formulas (I) and (II), or in mixtures of these tautomeric forms, the compositions of which are dependent upon such factors as the nature of the various substituents and the physical environment of the molecule.

As can be seen in Formula (I) above, the compounds of the present invention are all aromatic tricyclic ring structures which are separated from various ring size lactamimides by a methylene or substituted methylene radical. The tricyclic rings which are encompassed within the scope of the present invention include fluorene, phenanthrene, 9,10-dihydrophenanthrene, dibenzofuran and dibenzothiophene, as indicated by the symbol X in Formula (I) above. These tricyclic rings are attached at any one of four positions in the aromatic portion of the molecule.

The alkylene bridge which separates the tricyclic ring from the lactamimide portion of the molecule includes the methylene radical, in which R is hydrogen, as the simplest representative of this class of compounds. Also included are lower alkyl substituted methylene radicals in which the lower alkyl group has from 1 to 4 carbon atoms. Illustrative members of this group include methyl, ethyl, propyl, isopropyl, sec.-butyl and t.-butyl.

The nitrogen atom in the lactam ring, represented by the symbol $R_1$, may be either unsubstituted or may be substituted with a lower alkyl group having from 1 to 4 carbon atoms. Illustrative of the members of this group are the radicals described in the aforementioned symbol R.

As seen in Formula (I) above, the lactamimide portion of the molecule may vary in ring size from that of a 5 to a 13-membered ring, one member of which must be nitrogen. Thus, the compounds of this inventon include derivatives of pyrrolidine, piperidine, hexahydro-1H-azepine, octahydroazocine, octahydro-1H-azonine, azacyclodecane, azacycloundecane, azacyclododecane and azacyclotridecane.

A preferred sub-class of lactamimides is obtained in which $n$ has a value of from 5 to 7; R is methyl; $R_1$ is hydrogen and X is either oxygen or sulfur. These dibenzofuran or dibenzothiophene derivatives of hexahydro-1H-azepine, octahydroazocine and octahydro-1H-azonine are readily prepared and are characterized by their good anti-coagulant activity while, at the same time, being devoid of diuretic and/or hypoglycemic activity.

Illustrative specific base compounds which are encompassed by Formula (I) above include:
1-butyl-2[1-(2-dibenzothienyl)ethylimino]pyrrolidine,
2-[1-(2-fluorenyl)ethylimino]pyrrolidine,
2-[2-methyl-1-(3-phenanthryl)propylimino]pyrrolidine,
2-[1-(2-dibenzofuranyl)propylimino]piperidine,
2-[1-(4-dibenzothienyl)-ethylimino]-1-methylpiperidine,
2-[1-(2-fluorenyl)-pentylimino]hexahydro-1H-azepine,
hexahydro-2-[1-(9-phenanthryl)ethylimino]-1H-azepine,
hexahydro-2-[1-(2-phenanthryl)ethylimino]-1H-azepine,
2-[1-(9,10-dihydro-2-phenanthryl)propylimino]
  hexahydro-1H-azepine,
2-[1-(2-dibenzothienyl)ethylimino]hexahydro-1-methyl-
  1H-azepine,
2-[1-(2-dibenzothienyl)ethylimino]octahydro-azocine,
2-[1-(2-dibenzofuranyl)ethylimino]octahydro-1H-
  azonine,
2-[1-(2-fluorenyl)ethylimino]decahydroazecine,
2-[1-(3-phenanthryl)ethylimino]azacycloundecane,
2-[1-(2-dibenzothienyl)ethylimino]azacyclododecane, and
2-[1-(2-dibenzothienyl)ethylimino]azacyclotridecane.

The expression "pharmaceutically acceptable acid addition salts" refers to any non-toxic organic or inorganic acid addition salts of the base compounds represented by Formula I. Illustrative inorganic acids which form suitable salts include hydrochloric, hydrobromic, sulfuric and phosphoric acids as well as acid metal salts such as sodium monohydrogen orthophosphate and potassium hydrogen sulfate. Illustrative organic acids which form suitable salts include the mono, di and tricarboxylic acids. Illustrative of such acids are, for example, acetic, propionic, glycolic, lactic, pyruvic, malonic, succinic, glutaric, fumaric, malic, tartaric, citric, ascorbic, maleic, hydroxymaleic, benzoic, p-hydroxybenzoic, phenylacetic, cinnamic, salicylic, 2-phenoxybenzoic and sulfonic acids such as methanesulfonic acid and 2-hydroxy-ethenesulfonic acid. Either the mono or the di-acid salts can be formed, and such salts can be utilized in either a hydrated or a substantially anhydrous form.

In general the tricyclic aralalkylene lactamimides in which $R_1$ is hydrogen are prepared by reacting an excess amount of a lactim ether with a primary amine, as illustrated in the following reaction scheme:

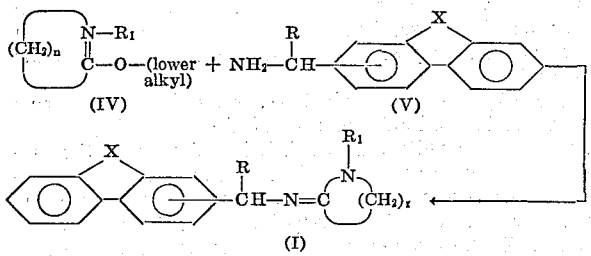

In the above sequence the symbols n, R and X have the values previously assigned. The reaction is conducted in a manner similar to that reported by R. E. Benson and T. L. Cairns, J. Am. Chem. Soc. 70, 2115-8 (1948), and may be carried out either in the presence or in the absence of a solvent. Suitable solvents include the lower alcohols such as methanol or ethanol, benzene, toluene and the like, with the lower alcohols being the solvents of choice. A basic or acidic catalyst such as a tertiary amine or hydrogen chloride may be added to the reaction mixture. In general the hydrochloride salt of the reactant primary amine is preferred for use in this reaction. The temperature of the reaction mixture may vary from −40 °C. to 180° C., preferably the temperature ranges from about 15° C. to 25° C. The reaction time may vary from a period of from about 1 hour to about 60 days depending upon the temperature of the reaction, the reactant primary amine, and more particularly the degree of steric hindrance of the amine, inasmuch as highly sterically hindered amines react much more slowly.

The lactim ethers (IV) which find use in this reaction can be prepared from corresponding commercially available lactams by methods known in the art. For example, the reaction of an appropriate lactam with dimethyl sulfate in a solvent such as benzene, toluene, xylene or the like at the reflux temperature of the particular solvent selected for a period of from 2 to 24 hours results in the formation of the corresponding O-methyllactim ether.

The primary amines (V) used as starting materials in the above reaction are obtained using any of several known methods. These amines can be used either as the free amine or their hydrochloride salt. Such amines can be prepared by the Leuckart reaction, whereby the appropriate tricyclic methylketone is heated with ammonium formate at a temperature of from about 180–200° C. for a period ranging from 2 to 12 hours so as to form the desired amine. The appropriate tricyclic lower alkyl ketone can be obtained by a standard Friedel-Crafts acylation of the appropriate tricyclic ring. Alternatively, the tricyclic lower alkyl ketones may be obtained by the reaction of methyl magnesium halide with an appropriate cyano substituted tricyclic ring. The Grignard complex formed may be reduced in situ with lithium aluminum hydride to the corresponding amine, thereby avoiding the Leuckart reaction.

The above reaction may be carried out in a similar fashion by using known thiolactim ethers such as S-methylthiocaprolactim [H. Behringer and H. Meier, Ann. 607, 67–91 (1957)], or by using thiolactams wherein it may be advantageous to employ a catalyst such as mercury, silver oxide or cyanide [J. A. Gautier and J. Renault, C.R. Acad. Sci. 234, 2081 (1952)].

The compounds of this invention can also be prepared using a complex of an appropriate lactam with phosphorous oxychloride, phosgene, borontrifluoride etherate, dimethyl sulfate, hydrogen halide or a combination of two or more such reagents. This reaction has been studied by H. Bredereck in a series of articles in Chem. Ber., 1953–1968, particularly volume 94, 2278 (1961) and volume 97, 1403 (1964). The complex formed is reacted with an appropriate primary amine described hereinabove in an aromatic hydrocarbon solvent such as benzene, toluene or xylene or an alkyl polyhalide solvent such as carbon tetrachloride, chloroform, methylene chloride, tetrachloroethylene or the like. The reaction temperature is limited by the boiling point of the solvent. However, in some cases it is advantageous to carry out the reaction at room temperature or with cooling at 0 to −40° C. depending on the reactants. This reaction is particularly suitable for the preparation of lactamimides in which the symbol $R_1$ is lower alkyl. Compounds in which the lactamide ring is piperidine may be conveniently prepared by catalytic hydrogenation of an appropriate amino pyridine derivative as described by T. B. Grave, J. Am Chem. Soc. 46, 1460 (1924), M. Freifelder et al., J. Org. Chem. 29, 3730 (1964) and L. Birkofer, Ber. 75, 429 (1942).

The compounds of the present invention, including their acid addition salts and isomers, are useful as anticoagulants. They affect the coagulation of blood by preventing the aggregation of blood platelets. The blood platelets play a dominant role in thrombotic conditions, both in the initial event and at the occlusive stage. Arterial thrombosis, particularly in arteries supplying the heart muscle and brain, is a leading cause of death and disability. The compounds of the present invention can be administered to animals, mammals and humans, either *per se* or in combination with conventional pharmaceutical carriers in dosage unit forms. Suitable dosage unit forms include oral preparations such as tablets, capsules, powders, granules, oral solutions and suspension, sublingual and intrabuccal preparations, as well as parenteral dosage unit forms which are useful for subcutaneous, intramuscular or intravenous administration. The quantity of active ingredient administered can vary over a wide range so as to provide from about 1.0 mg./kg. to about 100 mg./kg. of body weight per day in order to achieve the desired effect. Each unit dose can contain from about 5 to 500 mg. of the active ingredient in combination with the pharmaceutical carrier. Such doses may be administered from 1 to 4 times daily.

In preparing solid compositions such as tablets, the principal active ingredient is mixed with conventional pharmaceutical excipients such as gelatin, starches, lactose, magnesium stearate, talc, acacia, dicalcium phosphate and functionally similar materials. Tablets can be laminated, coated or otherwise compounded to provide for a prolonged or delayed action and to release a predetermined successive amount of medication. Capsules are prepared by mixing the active ingredient with an inert pharmaceutical filler or diluent and filled in either hard gelatin capsules or machine encapsulated soft gelatin capsules. Syrups or elixirs can contain the active ingredients together with sucrose or other sweetening agents, methyl and propyl parabens as preservatives, and suitable coloring and flavoring agents.

Parenteral fluid dosage forms are prepared by utilizing the active ingredient in a sterile liquid vehicle, the preferred vehicle being water or a saline solution. Compositions having the desired clarity, stability and adaptability for parenteral use are obtained by dissolving from about 0.1 mg. to about 3 grams of the active ingredient in a vehicle consisting of a mixture of nonvolatile liquid polyethylene glycols which are soluble in both water and organic liquids, and which have molecular weights ranging from about 200 to about 1500. Such solutions may advantageously contain suspending agents, such as sodium carboxymethylcellulose, methylcellulose, polyvinylpyrrolidone or polyvinyl alcohol. Additionally, they may contain bactericidal and fungicidal agents, as for example, parabens, benzyl alcohol, phenol or thimerosal. If desired, isotonic agents can be included, such as sugar or sodium chloride, as well as local anesthetics, stabilizing or buffering agents. In order to further enhance stability, the parenteral compositions may be frozen after filling and water removed by freeze-drying techniques well known in the art, enabling such dry, lyophilized powders to be reconstituted immediately prior to their use.

The following preparation and examples are illustrative of the novel compounds of the present invention and their compositions, but are not to be construed as necessarily limiting the scope thereof.

EXAMPLE I

α-Methyl-2-dibenzothiophenemethylamine hydrochloride

To a mixture of 368.6 g. (2 moles) of dibenzothiophene and 533.4 g. (4 moles) of anhydrous aluminum chloride contained in 2 liters of carbon disulfide, which has been cooled to a temperature of 0° to −10° C., is added 157.0 g. (2 moles) of acetyl chloride via dropwise addition while maintaining the temperature below 0° C. Stirring is continued for 2 hours and the mixture poured into a HCl-ice mixture. The carbon disulfide layer is separated, the aqueous layer extracted with chloroform and the combined organic layers washed successively with 2N hydrochloric acid solution and 1.9N sodium carbonate solution. The solvent extracts are dried over anhydrous sodium sulfate, evaporated to dryness and the residue distilled at 164–238° C. (0.02 mm.). Crystallization of the distillate from methanol yielded 2-acetyldibenzothiophene having a M.P. 105–9° C.

A mixture containing 121.4 g. (0.536 mole) of this ketone and 135.5 g. (2.145 moles) of ammonium formate is slowly heated to 185° C. and maintained at that temperature for a period of 6 hours. Upon cooling the mixture is washed with water and the combined aqueous washes extracted with a small amount of benzene. The benzene extract is added to the residue and 250 ml. of concentrated HCl added. The mixture is heated on a steam bath for approximately 4 hours, and cooled. The precipitated product is collected, washed with ether and recrystallized from an isopropanol-water mixture to yield the desired α-methyl-2-dibenzothiophenemethylamine in the form of its hydrochloride salt, M.P. 281–3° C. (dec.).

Following essentially the same procedure but substituting for the dibenzothiophene above the tricyclic compounds fluorene, phenanthrene, 9,10-dihydrophenanthrene and dibenzofuran results in the formation of the following primary amines as their hydrochloride salts respectively: α-methyl-2-fluorenemethylamine hydrochloride, M.P. 251–4° C. (dec.), α-methyl-3-phenanthrenemethylamine hydrochloride, M.P. 266–7° C., 9,10-dihydro-α-methyl-2-phenanthrenemethylamine hydrochloride, and α-methyl-2-dibenzofuranmethylamine hydrochloride, M.P. 222–3° C.

EXAMPLE II

2-[1-(2-dibenzothienyl)ethylimino]hexahydro-1H-azepine

A mixture of 77.3 g. (0.293 mole) of α-methyl-2-dibenzothiophenemethylamine hydrochloride and 78 ml. (0.54 mole) of O-methylcaprolactim is stirred and allowed to stand at room temperature for a period of 5 days with occasional stirring. Small portions of absolute ethanol are added periodically to keep the slurry stirrable. The mixture is cooled to −20° C., the precipitate collected, washed with small portions of ether and recrystallized twice from a mixture of acetone-methanol to yield the desired 2-[1-(2-dibenzothienyl)ethylimino]hexahydro-1H-azepine as the hydrochloride salt, M.P. 270–1° C. (dec.).

EXAMPLE III

2-[1-(2-fluorenyl)ethylimino]-hexahydro-1H-azepine

Following essentially the same procedure described in Example II, but substituting α-methyl-2-fluorenemethylamine hydrochloride for the α-methyl-2-dibenzothiophenemethylamine hydrochloride above, results in the formation of 2-[1-(2-fluorenyl)ethylimino]hexahydro-1H-azepine as the hydrochloride salt, having a M.P. of 274–6° C. (dec.).

EXAMPLE IV

Hexahydro-2-[1-(3-phenanthryl)ethylimino]-1H-azepine

Following essentially the same procedure described in Example II, but substituting α-methyl-3-phenanthrenemethylamine hydrochloride for the α-methyl-2-dibenzothiophenemethylamine hydrochloride above results in the formation of hexahydro-2-[1-(3-phenanthryl)ethylimino]-1H-azepine as the hydrochloride salt, having a M.P. of 262–4° C. (dec.).

EXAMPLE V

2-[1-(2-fluorenyl)ethylimino]-octahydro-1H-azonine

Following essentially the same procedure described in Example II, but substituting α-methyl-2-fluorenemethylamine hydrochloride for the α-methyl-2-dibenzothiophenemethylamine hydrochloride and O-methylcaprylactim for the O-methylcaprolactim above, results in the formation of 2-[1-(2-fluorenyl)ethylimino]octahydro-1H-azonine as its hydrochloride salt, having an M.P. of 276–7° C.

EXAMPLE VI

2-[1-(dibenzofuran-2-yl)ethylimino]-hexahydro-1H-azepine

Following essentially the same procedure described in Example II, but substituting α-methyl-2-dibenzofuranmethylamine hydrochloride for the α-methyl-2-dibenzothiophenemethylamine hydrochloride above, results in the formation of 2-[1-(dibenzofuran-2-yl)ethylimino]hexahydro-1H-azepine as the hydrochloride salt, having an M.P. of 304–6° C. (dec.).

EXAMPLE VII

2-[1-(dibenzofuran-2-yl)ethylimino]pyrrolidine

Following essentially the same procedure described in Example II, but substituting α-methyl-2-dibenzofuranmethylamine hydrochloride for the α-methyl-2-dibenzothiophenemethylamine hydrochloride and O-methylbutyrolactim for the O-methylcaprolactim above, results in the formation of 2-[1-(dibenzofuran-2-yl)ethylimino]pyrrolidine as the hydrochloride salt, having an M.P. of 188–91° C. (dec.).

EXAMPLE VIII

2-[1-(9,10-dihydro-2-phenanthryl)ethylimino]hexahydro-1H-azepine hydrochloride

Following essentially the same procedure described in Example II above, but substituting 9,10-dihydro-α-methyl-2-phenanthrenemethylamine hydrochloride for the α-methyl-2-dibenzothiophenemethylamine hydrochloride results in the formation of 2-[1-(9,10-dihydro-2-phenanthryl)ethylimino] - hexahydro-1H-azepine hydrochloride.

EXAMPLE IX

2-[1-(2-dibenzothienyl)ethylimino]-1-methylpyrrolidine hydrochloride

To 9.9 g. (0.1 mole) of 1-methyl-2-pyrrolidone in 200 ml. of benzene is added dropwise 7.7 g. (0.05 mole) of phosphorus oxychloride. The mixture is stirred at room temperature for a period of 4 hours and α-methyl-2-dibenzothiophenemethylamine hydrochloride, 13.2 g. (0.05 mole), is added. The mixture is stirred at room temperature for 1 hour and then at its reflux temperature for an additional period of 4 hours. After cooling overnight, 2N hydrochloric acid is added, the benzene layer separated and the aqueous layer made alkaline with 2N NaOH. The aqueous solution is extracted with ether, dried over anhydrous sodiumsulfate, and the residue obtained after removal of the solvent is converted to the hydrochloride salt and is recrystallized from acetone to yield the desired product, 2 - [1-(2-dibenzothienyl)ethylimino]-1-methylpyrrolidine hydrochloride.

EXAMPLE X

2-[1(2-dibenzothienyl)ethylimino]azacyclotridecane hydrochloride

Following essentially the same procedure described in the preceding Example, but substituting 2-azacyclotridecanone for 1-methyl-2-pyrrolidone results in the formation of 2 - [1-(2-dibenzothienyl)ethylimino]azacyclotridecane hydrochloride.

EXAMPLE XI

The anticoagulant activity of the compounds of this invention is determined by the inhibition of platelet (white thrombus) aggregation, which is the initial phase involved in the coagulation of blood. Platelet-rich plasma, (PRP) obtained from a human volunteer, having a platelet count of approximately 400,000/mm.$^3$ is aggregated using approximately 2 micrograms of adenosine diphosphate per ml. of PRP. Quantitative platelet aggregation measurements are made using a photometer connected to an automatic recorder which measures the changes in optical clarity of a standard cell containing the test solution. As the platelets aggregate, light transmission increases and thus both the rate of aggregation and the degree of aggregation can be determined. In this fashion, adenosine diphosphate induced aggregation of platelet-rich plasma is compared under identical circumstances to a corresponding aliquot containing a dilute solution of the test compound. The results are expressed as a percent inhibition.

Following this procedure the compound 2-[1-(2-dibenzothienyl)ethylimino]hexahydro - 1H-azepine hydrochloride at concentrations of 100, 30, and 10 micrograms/milliliter demonstrates an *in vitro* inhibition of adenosine diphosphate induced platelet aggregation in human platelet-rich plasma of 100%, 52%, and 2% respectively.

EXAMPLE XII

Preparation of a tablet formulation

One thousand tablets for oral use, each containing 25 mg. of 2-[1-(2-dibenzothienyl)ethylimino]hexahydro-1H-azepine hydrochloride are prepared according to the following formulation:

| | Grams |
|---|---|
| (a) 2 - [1-(2-dibenzothienyl)ethylimino]hexahydro-1H-azepine hydrochloride | 25 |
| (b) Dicalcium phosphate | 150 |
| (c) Methylcellulose, U.S.P. (15 cps.) | 6.5 |
| (d) Talc | 20 |
| (e) Calcium stearate | 2.5 |

The 2-[1-(2-dibenzothienyl)ethylimino]hexahydro-1H-azepine hydrochloride and dicalcium phosphate are mixed well, granulated with a 7.5% aqueous solution of methylcellulose, passed through a No. 8 screen and carefully dried. The dried granules are passed through a No. 12 screen, blended with talc and calcium stearate and compressed into tablets.

EXAMPLE XIII

Preparation of a capsule formulation

One thousand two-piece hard gelatin capsules for oral use each containing 100 mg. of 2-[1-(2-dibenzothienyl)-ethylimino]hexahydro-1H-azepine hydrochloride are prepared from the following ingredients:

| | Grams |
|---|---|
| (a) 2 - [1-(2-dibenzothienyl)ethylimino]-hexahydro-1H-azepine hydrochloride | 100 |
| (b) Lactose, U.S.P. | 100 |
| (c) Starch, U.S.P. | 10 |
| (d) Talc, U.S.P. | 5 |
| (e) Calcium stearate | 1 |

The finely powdered materials are mixed until uniformly dispersed and filled into hard shelled gelatin capsules of the appropriate size.

In a similar fashion one-piece soft gelatin capsules can be prepared in which the above formulation can be granulated, slugged or compressed directly into a rotary die or plate mold in which the capsule is formed. Alternatively, the above excipients may be omitted and the active ingredient dispensed as a powder directly into the capsule.

EXAMPLE XIV

Preparation of a parenteral solution

A sterile aqueous suspension suitable for parenteral use is prepared from the following ingredients:

|     | Grams |
| --- | --- |
| (a) 2 - [1 - (2-dibenzothienyl)ethylimino]-hexahydro-1H-azepine hydrochloride | 1 |
| (b) Polyethylene glycol 4000, U.S.P. | 3 |
| (c) Sodium chloride | 0.9 |
| (d) Polyoxyethylene derivative of sorbitan monooleate (Tween 80) U.S.P. | 0.4 |
| (e) Sodium metabisulfite | 0.1 |
| (f) Methylparaben, U.S.P. | 0.18 |
| (g) Propylparaben, U.S.P. | 0.02 |
| (h) Water for injection q.s. to 100 ml. | |

The parabens, sodium metabisulfite, and sodium chloride are dissolved in approximately one-half the volume of water for injection at 80° C. with stirring. The solution is cooled to below 40° C. and the active ingredient is dissolved therein followed by the polyethylene glycol 4,000 and the polyoxyethylene derivatives of sorbitan monooleate. The cooled solution is adjusted to the final volume with water for injection and is then sterilized by sterile filtration through a suitable filter. Each one ml. of solution contains 10 mg. of 2-[1-(2-dibenzothienyl)-ethylimino]hexahydro-1H-azepine hydrochloride as the active ingredient.

We claim:

1. A tricyclic aralkylene lactamimide having the formula:

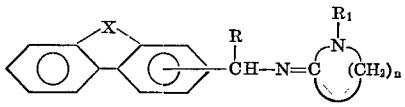

wherein $n$ is an integer of from 3 to 11; R and $R_1$ are each selected from the group consisting of hydrogen and lower alkyl having from 1 to 4 carbon atoms; X is selected from the group consisting of —$CH_2$—, —CH=CH—, —$CH_2CH_2$—, —O— or —S—; and the pharmaceutically acceptable acid addition salts thereof.

2. A compound of Claim 1 in which $n$ has a value of from 5 to 7; R is methyl; $R_1$ is hydrogen and X is oxygen or sulfur.

3. A compound of Claim 1 which is 2-[1-(2-dibenzothienyl)ethylimino]hexahydro-1H-azepine and its pharmaceutically acceptable acid addition salts.

4. A compound of Claim 1 which is 2-[1-(2-fluoroenyl)-ethylimino]hexahydro-1H-azepine and its pharmaceutically acceptable acid addition salts.

5. A compound of Claim 1 which is 2-[1-(dibenzofuran-2-yl)ethylimino]pyrrolidine and its pharmaceutically acceptable acid addition salts.

References Cited

FOREIGN PATENTS 783,275   5/1971   Belgium _____ 260—239 B

ALTON D. ROLLINS, Primary Examiner
M. L. BERCH, Assistant Examiner

U.S. Cl. X.R.

260—239 BE, 293.57, 293.58, 293.62, 294.8 B, 296 T, 326.5 CA, 326.84, 326.85, 326.9, 329.3, 346.2 M, 570.8 TC; 424—244, 267, 274, 275, 285